United States Patent
Nakamura et al.

(10) Patent No.: US 11,520,637 B2
(45) Date of Patent: Dec. 6, 2022

(54) RESOURCE RESERVATION MANAGEMENT DEVICE, RESOURCE RESERVATION MANAGEMENT METHOD, AND RESOURCE RESERVATION MANAGEMENT PROGRAM

(71) Applicant: Nippon Telegraph and Telephone Corporation, Tokyo (JP)

(72) Inventors: Tetsuro Nakamura, Tokyo (JP); Naoki Takada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 150 days.

(21) Appl. No.: 17/265,701

(22) PCT Filed: Jul. 23, 2019

(86) PCT No.: PCT/JP2019/028748
§ 371 (c)(1),
(2) Date: Feb. 3, 2021

(87) PCT Pub. No.: WO2020/031680
PCT Pub. Date: Feb. 13, 2020

(65) Prior Publication Data
US 2021/0311805 A1  Oct. 7, 2021

(30) Foreign Application Priority Data
Aug. 9, 2018 (JP) .............................. JP2018-149846

(51) Int. Cl.
*G06F 9/50* (2006.01)
*G06F 9/48* (2006.01)

(52) U.S. Cl.
CPC .............. *G06F 9/5077* (2013.01); *G06F 9/48* (2013.01); *G06F 9/4806* (2013.01);
(Continued)

(58) Field of Classification Search
CPC ........ G06F 9/48; G06F 9/4806; G06F 9/4841; G06F 9/4843; G06F 9/4881; G06F 9/50;
(Continued)

(56) References Cited

U.S. PATENT DOCUMENTS

2013/0138807 A1* 5/2013 Perkuhn ................ H04W 28/26
709/224
2015/0006729 A1* 1/2015 Parakh .................... H04L 67/10
709/226

(Continued)

OTHER PUBLICATIONS

Nathani et al., "Policy based resource allocation in IaaS cloud", Future Generation COmputer Systems 28 (2012), pp. 94-103 (Year: 2012).*

(Continued)

*Primary Examiner* — Charles M Swift
(74) *Attorney, Agent, or Firm* — Fish & Richardson P.C.

(57) ABSTRACT

[Problem] Available resources are efficiently used even in a case in which continuous available resources cannot be secured on a cloud.
[Solution] A resource reservation management apparatus 10 includes: a storage unit that stores a resource capacity and resource reservation information of a computing machine; a reservation notification unit 11 that receives, from a user terminal, reservation request information including an operating requested time period, an operating time, and a requested specification as a reservation of a master lease; a scheduling unit 12 that creates slave leases by splitting the operating time of the master lease in accordance with times corresponding to available resources indicated in the resource reservation information and sets the slave leases in the resource reservation information; a reservation management unit that detects occurrence of predetermined events including stop, shift, restart, and deletion of the created instances by referring to the resource reservation informa- (Continued)

tion; and an instance management unit 15 that transmits instruction information in accordance with an instance creation instruction and the detected predetermined events to the computing machine 15.

3 Claims, 6 Drawing Sheets

(52) U.S. Cl.
CPC .......... *G06F 9/4843* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5022* (2013.01); *G06F 9/5027* (2013.01); *G06F 9/5038* (2013.01); *G06F 9/5061* (2013.01); *G06F 9/5083* (2013.01); *G06F 2209/5014* (2013.01)

(58) Field of Classification Search
CPC .... G06F 9/5005; G06F 9/5011; G06F 9/5022; G06F 9/5027; G06F 9/5038; G06F 9/505; G06F 9/5061; G06F 9/5077; G06F 9/5083; G06F 2209/5014
See application file for complete search history.

(56) References Cited

U.S. PATENT DOCUMENTS

2015/0178126 A1* 6/2015 Modani ................ G06F 9/4881
718/102
2016/0071199 A1* 3/2016 Teksler ............. G06Q 30/0645
705/307

OTHER PUBLICATIONS

Docs.openstack.org, [online], "Blazar, the OpenStack Reservation Service," Jul. 3, 2018, retrieved on Jul. 30, 2018, retrieved from URL<https://docs.openstack.org/blazar/latest/>, 3 pages.

* cited by examiner

RESOURCE RESERVATION MANAGEMENT DEVICE, RESOURCE RESERVATION MANAGEMENT METHOD, AND RESOURCE RESERVATION MANAGEMENT PROGRAM

CROSS-REFERENCE TO RELATED APPLICATIONS

This application is a National Stage application under 35 U.S.C. § 371 of International Application No. PCT/JP2019/028748, having an International Filing Date of Jul. 23, 2019, which claims priority to Japanese Application Serial No. 2018-149846, filed on Aug. 9, 2018. The disclosure of the prior application is considered part of the disclosure of this application, and is incorporated in its entirety into this application.

TECHNICAL FIELD

The present disclosure relates to a resource reservation management apparatus, a resource reservation management method, and a resource reservation management program in a resource sharing system through which a plurality of users share resources.

BACKGROUND ART

In cloud services such as Infrastructure-as-a-Service (IaaS), a model has been widely used in which a plurality of users (services, applications, and the like) share resources (computing machines and the like) and each user utilizes a necessary amount of resources as needed.

In a cloud operating system using OpenStack, for example, users are allowed to reserve resources using a service called Blazar (see Non Patent Literature 1). In Blazar, it is possible to allocate and reserve resources to be provided to instances for workloads that need to be executed in the future for each specific continuous operating time.

FIG. 5 is a diagram schematically illustrating a resource reservation table (time table) managed by Blazar.

FIG. 5 illustrates an example in which resources are configured of four host machines (hereinafter, referred to as "hosts") (hosts 1 to 4). Note that the hosts are configured of computing machines (resources such as virtual CPUs, memories, disks, and the like) creating virtual machines (instances).

In Blazar, authorization for utilizing resources is given to a user (user terminal) by managing a reservation for each resource (host) as illustrated in FIG. 5.

For example, the host 2 is free (free state) from 0:00 on April 1st to 0:00 on April 2nd, 0:00 on April 2nd to 0:00 on April 4th is reserved for a project A, and 0:00 on April 5th to 0:00 on April 7th is reserved for a project D.

A plurality of users can partially reserve a single host machine. For example, the host 1 is reserved for the project A and a project B from 0:00 on April 1st to 0:00 on April 4th (reference sign a in FIG. 5).

In Blazar, a reservation is made by designating a time (start clock time and end clock time) and a capacity of a resource to be used (resource capacity) (requested specification) when the resource is reserved. For example, a reservation (lease) is requested by a user (user terminal) with information "2018/4/1 0:00 to 2018/4/5 0:00, reserve one instance with 4 cores and 16 GB RAM mounted thereon". Thus, the host 4 can be reserved for an instance of a project C as represented by the reference sign b in FIG. 5.

CITATION LIST

Non Patent Literature

Non Patent Literature 1: "Blazar, the Open Stack Reservation Service" [online], [retrieved on Jul. 30, 2018], Internet: <URL: https://docs.openstack.org/blazar/latest/>

SUMMARY OF THE INVENTION

Technical Problem

However, according to the method of making a reservation by designating a time (start clock time and end clock time) and a resource capacity as in Blazar of OpenStack disclosed in Non Patent Literature 1 described above, in a case in which available resources are present in a temporary discontinuous manner on one host or across a plurality of hosts, even if resources are present in a time that the user desires in total, the user cannot reserve the resources.

As illustrated in FIG. 6, for example, even in a case in which there are available resources of three days or more in total from 0:00 on April 1st to 0:00 on April 7th, the user cannot secure the three-day available resources for the same instance because the resources are discontinuous and are provided by different hosts (reference sign c in FIG. 6).

In other words, the following problems exist.

(Problem 1) It is not possible to reserve temporally discontinuous available resources for one instance.

(Problem 2) It is not possible to reserve resources provided by different hosts for one instance.

Resource availability in a resource reservation table illustrated in FIG. 6 is information inside a cloud, the information is thus provided only to a service provider (service provider terminal), and a user cannot know when resources are available and how long the resources are available at this time. Additionally, even if the user can know the resource availability, splitting and reserving the resources in accordance with the availability is an operation that requires a lot of effort.

The present disclosure has been made in view of such circumstances, and an object thereof is to provide a resource reservation management apparatus, a resource reservation management method, and a resource reservation management program that enable efficient utilization of available resources even in a case in which it is not possible to secure a continuous available resource on a cloud.

Means for Solving the Problem

In order to achieve the aforementioned object, the disclosure according to a first aspect is a resource reservation management apparatus configured to perform management for providing, to a user terminal, resources configured of a plurality of computing machines on a cloud, the resource reservation management apparatus including: a storage unit configured to store a resource capacity of each of the computing machines and resource reservation information indicating a presence or absence of reservation setting of an instance in chronological order for each of the computing machines; a reservation notification unit configured to receive, as a reservation of a master lease, from the user terminal, reservation request information including an operating requested time period indicating a time period during which operating of the resources is requested, an operating time indicating a time during which the instance is to operate, and a requested specification indicating a resource capacity of a requested resource, and transmit, as reservation information, a reservation ID assigned to the reservation of the master lease and a reservation result of the resources to the user terminal that has transmitted the reservation request information; a scheduling unit configured to determine whether there is an available resource of each of the computing machines which satisfies the requested specification and a time of which is equal to or greater than the operating time in the operating requested time period of the master lease indicated by the reservation request information with reference to the resource capacity of each of the computing machines and the resource reservation information, and in a case in which there is no such available resource, create slave leases by splitting the operating time of the master lease in accordance with times corresponding to available resources indicated by the resource reservation information in the operating requested time period of the master lease, and set a reservation of each of the generated slave leases in the resource reservation information along with the reservation ID; a reservation management unit configured to detect occurrence of predetermined events including stop, shift, restart, and deletion of a created instance by referring to the resource reservation information at predetermined time intervals; and an instance management unit configured to receive an instance creation request including the reservation ID from the user terminal, identify a computing machine for executing an instance of each of the slave leases set in the resource reservation information using the reservation ID, transmit an instance creation instruction to the identified computing machine, cause the computing machine to create the instance, and transmit instruction information in accordance with the detected predetermined events to the computing machine.

The disclosure according to a second aspect is a resource reservation management method for a resource reservation management apparatus configured to perform management for providing, to a user terminal, resources configured of a plurality of computing machines on a cloud, in which the resource reservation management apparatus includes a storage unit configured to store a resource capacity of each of the computing machines and resource reservation information indicating a presence or absence of reservation setting of an instance in chronological order for each of the computing machines, and the resource reservation management method includes: receiving, as a reservation of a master lease, from the user terminal, reservation request information including an operating requested time period indicating a time period during which operating of the resources is requested, an operating time indicating a time during which the instance is to operate, and a requested specification indicating a resource capacity of a requested resource, determining whether there is an available resource of each of the computing machines which satisfies the requested specification and a time of which is equal to or greater than the operating time in the operating requested time period of the master lease indicated by the reservation request information with reference to the resource capacity of each of the computing machines and the resource reservation information, and in a case in which there is no such available resource, creating slave leases by splitting the operating time of the master lease in accordance with times corresponding to available resources indicated by the resource reservation information in the operating requested time period of the master lease, and setting a reservation of each of the generated slave leases in the resource reservation information along with the reservation ID assigned to the master lease; transmitting, as reservation information, the reservation ID and a reservation result of the resources to the user terminal that has transmitted the reservation request information; receiving, from the user terminal, an instance creation request including the reservation ID, identifying a computing machine for executing an instance of each of the slave leases set in the resource reservation information using the reservation ID, transmitting an instance creation instruction to the identified computing machine, and causing the computing machine to create the instance; detecting occurrence of predetermined events including stop, shift, restart, and deletion of the created instance by referring to the resource reservation information at predetermined time intervals; and transmitting instruction information in accordance with the detected predetermined events to the computing machine.

The disclosure according to a third aspect provides a resource reservation management program that causes a computer to execute the resource reservation management method according to the second aspect.

In this manner, it is possible to create slave leases by splitting an operating time that a user requests and to set a reservation even in a case in which available resources on a cloud are present in a temporally discontinuous manner on one computing machine or across a plurality of computing machines and it is not possible to reserve a master lease. It is thus possible to efficiently utilize available resources.

Effects of the Invention

According to the present disclosure, it is possible to provide a resource reservation management apparatus, a resource reservation management method, and a resource reservation management program that enable efficient utilization of available resources even in a case in which it is not possible to secure a continuous available resource on a cloud.

DESCRIPTION OF EMBODIMENTS

Hereinafter, an embodiment for implementing the present disclosure (hereinafter referred to as "the present embodiment") will be described. First, an outline of processing executed by a resource reservation management apparatus 10 according to the present embodiment will be described.

Outline

Figure 5:
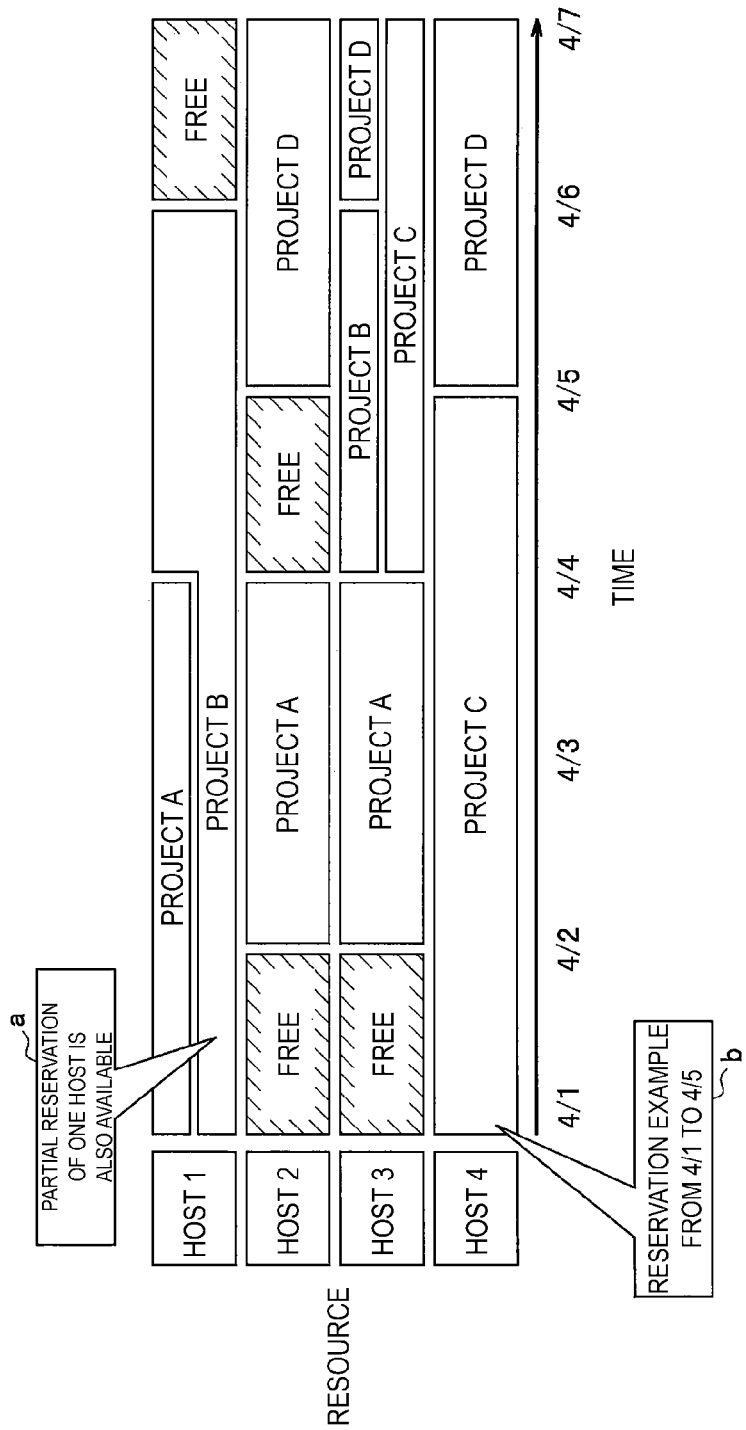
FIG. 5 is a diagram schematically illustrating a time table managed by Blazar that is a related art.
Figure 6:
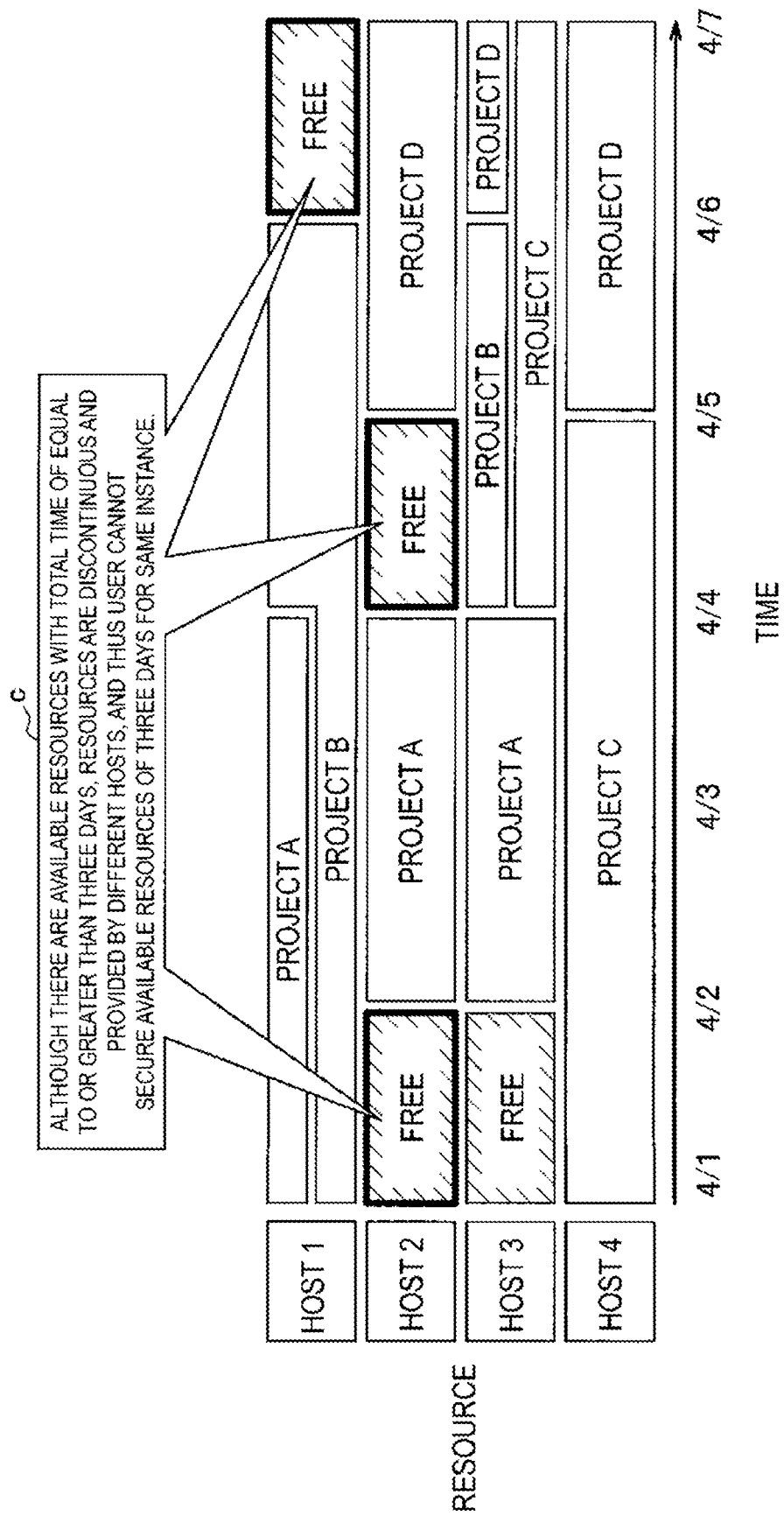
FIG. 6 is a diagram for explaining a problem in resource reservation using Blazar that is a related art.

The resource reservation management apparatus 10 according to the present embodiment operates on the assumption that a user (user terminal) designates a time for a reservation and that the reservation is managed in association with resources (each host) as in the reservation (lease) method in FIGS. 5 and 6 illustrated as a related art.

In a reservation using the resource reservation management apparatus 10, concepts of an operating time and slave leases are introduced. In the related art, a user designates a "time (a start clock time and an end clock time)" for a reservation. On the other hand, the resource reservation management apparatus 10 according to the present embodiment receives, from the user (user terminal), a start clock time and an end clock time of a time period during which operating is requested (hereinafter, referred to as an "operating requested time period") and a time during which an instance is to operate (hereinafter, referred to as an "operating time"). The operating time is a time during which the user desires to cause a resource to actually operate in a time period during which operating is requested by the user. Note that the operating time may be designated by a time in a time period during which operating is requested (12 hours or one day (24 hours), for example) or may be designated by an operating rate. If the time period during which operating is requested is two days, and the operating rate is 25%, for example, 12 hours are defined as the "operating time".

The resource reservation management apparatus 10 according to the present embodiment receives reservation request information exemplified below from the user terminal. "2018/4/1 0:00 to 2018/4/7 0:00, 3 days, reserve one instance with 4 cores and 16 GB RAM mounted thereon". Here, "2018/4/1 0:00 to 2018/4/7 0:00" indicates a start clock time and an end clock time of the operating requested time period.

"3 days" is a time (operating time) during which the instance is to operate.

"4 cores, 16 GB RAM" is a resource capacity (requested specification).

Note that information of a reservation (lease) indicated by the reservation request information will be referred to as a "master lease".

The resource reservation management apparatus 10 according to the present embodiment performs resource reservation by distributing (splitting) the operating time for the master lease of the one instance such that the time during which the instance is to operate (operating time) indicated by the reservation request information received from the user terminal is satisfied in total. Each distributed lease will be referred to as a "slave lease".

Figure 1:
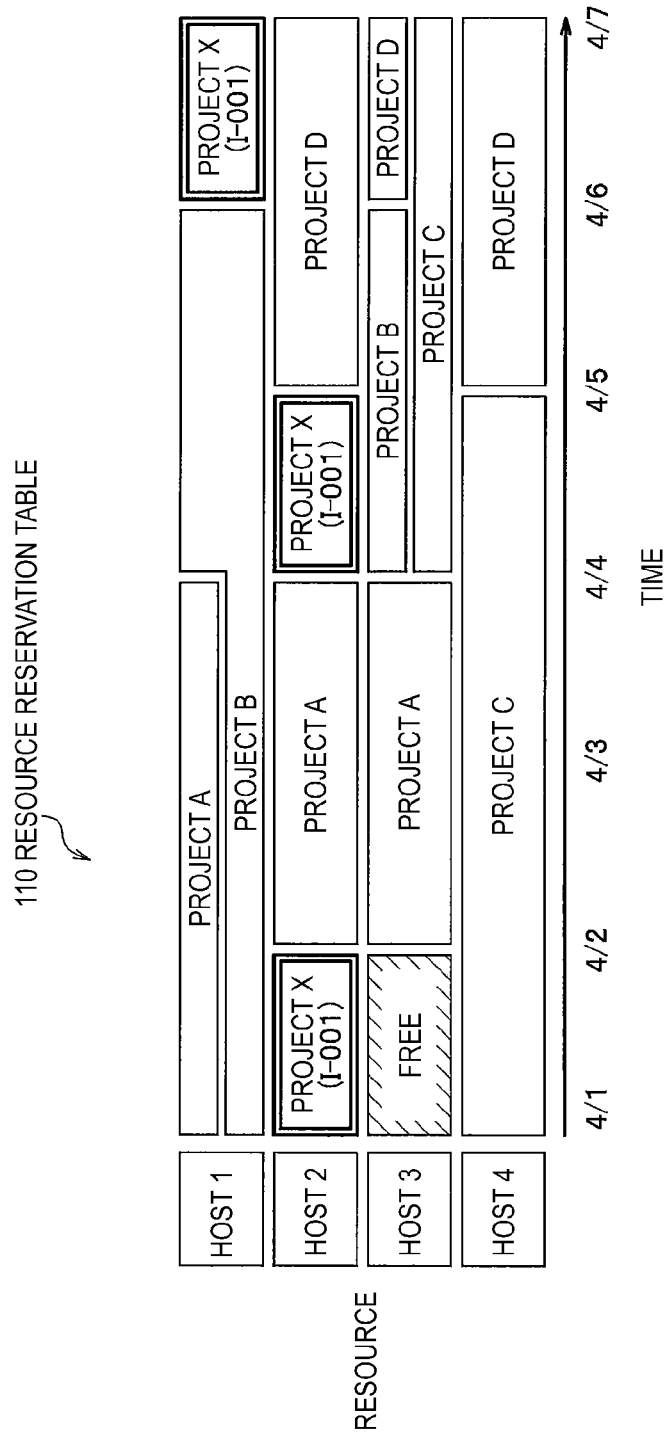
FIG. 1 is a diagram illustrating an example of a resource reservation table managed by a resource reservation management apparatus according to an embodiment.

FIG. 1 is a diagram illustrating an example of a resource reservation table 110 (resource reservation information) managed by the resource reservation management apparatus 10 according to the present embodiment.
On the assumption that the status of the available resources is the same as the state illustrated in FIG. 5, there are no "free" resources that can be reserved for continuous "3 days" indicated by the operating time in the operating requested time period of "2018/4/1 0:00 to 2018/4/7 0:00" indicated by the aforementioned reservation request information. In this case, the resource reservation management apparatus 10 refers to the resource reservation table 110 and makes a reservation by splitting the master lease into slave leases.

Specifically, the resource reservation management apparatus 10 splits the master lease into three slave leases to create reservation information on the basis of the available resource at this timing as will be described below.

"Host 2: 2018/4/1 0:00 to 2018/4/2 0:00"+"host 2: 2018/4/4 0:00 to 2018/4/5 0:00"+"host 1: 2018/4/6 0:00 to 2018/4/7 0:00".

FIG. 1 illustrates that an instance of the master lease for a project X is split into the three slave leases and that the available resources (free) in FIG. 5 are reserved for the three slave leases. Note that "I-001" in the drawing is a reservation ID, which will be described later, and the same reservation ID is assigned to each of slave leases obtained by splitting one master lease.

The resource reservation management apparatus 10 stops the instance at the end clock time of each slave lease and migrates the instance as needed. The resource reservation management apparatus 10 executes processing such as restart of the instance at the start clock time of each slave lease.

In this manner, the resource reservation management apparatus 10 according to the present embodiment can create slave leases by splitting the time during which the instance is to operate and to reserve the resources even in a case in which it is not possible to secure a continuous available resource. It is thus possible to efficiently utilize available resources. The provision of resources through split reservation by the resource reservation management apparatus 10 according to the present embodiment is particularly effective when a service provider provides, to a user, a virtual machine that executes a fault tolerant workload that does not require a specific continuous operating time using the same host, such as processing that does not require resource provision in real time, for example, scientific computation.

Present Embodiment

Next, a resource reservation management system 1000 that includes the resource reservation management apparatus 10 will be described.

Figure 2:
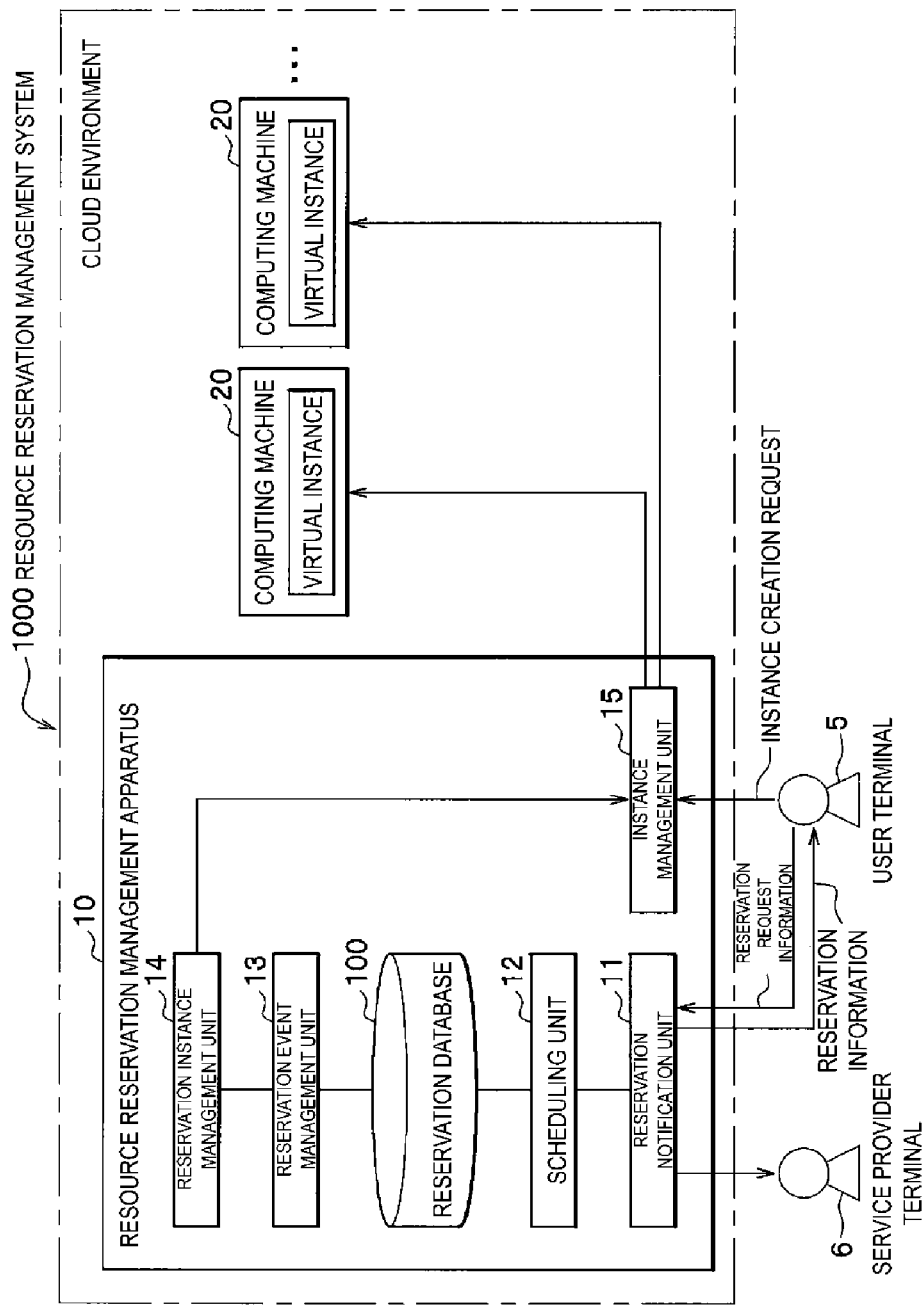
FIG. 2 is a diagram illustrating a configuration of a resource reservation management system including the resource reservation management apparatus according to the present embodiment.

FIG. 2 is a diagram illustrating a configuration of the resource reservation management system 1000 that includes the resource reservation management apparatus 10 according to the present embodiment.

The resource reservation management system 1000 includes a plurality of computing machines 20 that provide resources to a user terminal 5, and the resource reservation management apparatus 10 that manages provision of resources from the computing machines 20 to the user terminal 5. The resource reservation management apparatus 10 is communicatively connected to the plurality of computing machines 20 and is also connected to the user terminal 5 that is a terminal of a user who requests resources and to a management terminal (service provider terminal 6) of a service provider who performs the resource provision service.

Here, each computing machine 20 (host) includes a virtual CPU, a memory, a disk, and the like, is triggered by an instance creation request from the user terminal 5 to create a virtual machine (virtual instance), and provides resources to the user terminal 5.

The user terminal 5 is an apparatus that receives provision of resources from the computing machines 20 and reserves resources by transmitting reservation request information to the resource reservation management apparatus 10. If the user terminal 5 transmits the reservation request information to the resource reservation management apparatus 10, and thus a reservation is established, the user terminal 5 receives reservation information indicating details of the established reservation from the resource reservation management apparatus 10. At a start clock time of the reservation, the user terminal 5 transmits an instance creation request to the resource reservation management apparatus 10, so that resources are provided to the user terminal 5 from the computing machines 20.

The service provider terminal 6 is an apparatus that manages the overall resource reservation service performed by the resource reservation management system 1000.

Resource Reservation Management Apparatus

The resource reservation management apparatus 10 is achieved by a computer or the like provided with a control section, a storage section, and an input/output section (all of which are not illustrated).

The input/output section includes a communication interface for transmitting and receiving information and an input/output interface for transmitting and receiving information to and from input devices such as a touch panel and a keyboard and output devices such as a monitor.

The storage section (storage unit) includes a flash memory, a hard disk, a random access memory (RAM), or the like. The storage section of the resource reservation management apparatus 10 stores a reservation database 100 as illustrated in FIG. 2. The reservation database 100 stores information regarding resources of each of the computing machines 20 on a cloud (resource information) and the resource reservation table 110 (resource reservation information) (FIG. 1) indicating, for each of the computing machines 20 (hosts), information regarding instances, reservations of which are established. The storage section temporarily stores a program (resource reservation management program) for executing functions of the control section and information necessary for processing of the control section.

The control section includes a reservation notification unit 11, a scheduling unit 12, a reservation event management unit 13, a reservation instance management unit 14, and an instance management unit 15 as illustrated in FIG. 2. Note that the reservation event management unit 13 and the reservation instance management unit 14 configure the reservation management unit according to the claims.

The control section is achieved by a central processing unit (CPU), which is not illustrated, developing and executing a program (resource reservation management program) stored in the storage section, for example, on a RAM.

The reservation notification unit 11 receives reservation request information from the user terminal 5 and inquires of the scheduling unit 12 whether a reservation is available.

Here, the reservation request information received from the user terminal 5 includes information such as an operating requested time period (a start clock time and an end clock time of a time period during which operating is requested), a time (operating time) during which an instance is to operate, and a resource capacity (requested specification). As described above, the reservation request information is information indicated as "2018/4/1 0:00 to 2018/4/7 0:00, 3 days, reserve one instance with 4 cores and 16 GB RAM mounted thereon", for example.

In a case in which information indicating that the reservation is available is received from the scheduling unit 12, the reservation notification unit 11 transmits reservation information including a reservation ID that is identification information of the reservation, a time period during which resources are available, and host information of the reserved instances to the user terminal 5 that has transmitted the reservation request information.

Note that in a case in which information indicating that the reservation is not available is received from the scheduling unit 12, the reservation notification unit 11 transmits a reservation unavailable notification to the user terminal 5 and also transmits a resource shortage notification to the service provider terminal 6.

The scheduling unit 12 receives the reservation request information from the reservation notification unit 11 and executes reservation setting processing with reference to resource information of each of the computing machines 20 and the resource reservation table 110 (FIG. 1) in the reservation database 100.

Specifically, the scheduling unit 12 checks whether there are available resources of the hosts that satisfy a resource capacity (requested specification) in the operating requested time period indicated by the reservation request information with reference to the resource information of each of the computing machines 20 and the resource reservation table 110. In a case in which there is an available resource that can be set without temporally splitting a master lease, the scheduling unit 12 sets the reservation (master lease) of the available resource. Additionally, in a case in which there are no available resources that can be set without temporally splitting the master lease, the scheduling unit 12 creates slave leases by temporally splitting the master lease in accordance with available resources (free) indicated by the current resource reservation table 110 and sets reservations (slave leases) of the plurality of available resources.

In a case in which the reservation notification unit 11 receives the aforementioned reservation request information, for example, the scheduling unit 12 makes the following setting of the slave leases obtained by the splitting to the available resources (free) illustrated in FIG. 1 as illustrated in FIG. 1.

"Host 2: 2018/4/1 0:00 to 2018/4/2 0:00"+"host 2: 2018/4/4 0:00 to 2018/4/5 0:00"+"host 1: 2018/4/6 0:00 to 2018/4/7 0:00".

If the reservation is set, the scheduling unit 12 assigns a reservation ID ("I-001" illustrated in FIG. 1, for example) that is identification information unique to the reservation for each piece of the reservation request information (master lease) and outputs the reservation ID as reservation information to the reservation notification unit 11.

Note that the scheduling unit 12 sets the reservation in consideration of temporal margins required for stopping an instance or shifting to an instance of another host as well when the reservation is set in the resource reservation table 110 (FIG. 1).

The reservation event management unit 13 notifies the reservation instance management unit 14 that the instance is to be restarted at the start clock time of each slave lease by referring to the resource reservation table 110 (FIG. 1) in the reservation database 100 at predetermined time intervals.

The reservation event management unit 13 notifies the reservation instance management unit 14 that the instance is to be stopped at the end clock time of each slave lease.

Further, after the instance of each slave lease is stopped, if the computing machine 20 reserved for the next slave lease is different from the computing machine 20 of the current instance, the reservation event management unit 13 notifies the reservation instance management unit 14 that the instance is to be shifted (migrated) to the different computing machine 20.

The reservation event management unit 13 notifies the reservation instance management unit 14 that the instance is to be deleted when the master lease ends.

The reservation instance management unit 14 provides an instruction for restarting, stopping, shifting, and deleting instances to the instance management unit 15 in accordance with the notification from the reservation event management unit 13.

The instance management unit 15 is triggered by an instance creation request from the user terminal 5 to check with the reservation event management unit 13 via the reservation instance management unit 14 regarding the presence or absence of setting of a reservation (validity of reservation). In a case in which the setting of the reservation has been confirmed, the instance management unit 15 causes the reserved computing machine 20 to create an instance (virtual instance) by transmitting an instance creation instruction to the computing machine 20. Moreover, the instance management unit 15 is triggered by an instruction for restarting, stopping, shifting, or deleting the instance from the reservation instance management unit 14 to transmit instruction information to a target computing machine 20, thereby causing the computing machine 20 to execute designated processing (restart, stop, shift, or deletion of the instance).

Flowchart of Processing

Figure 3:
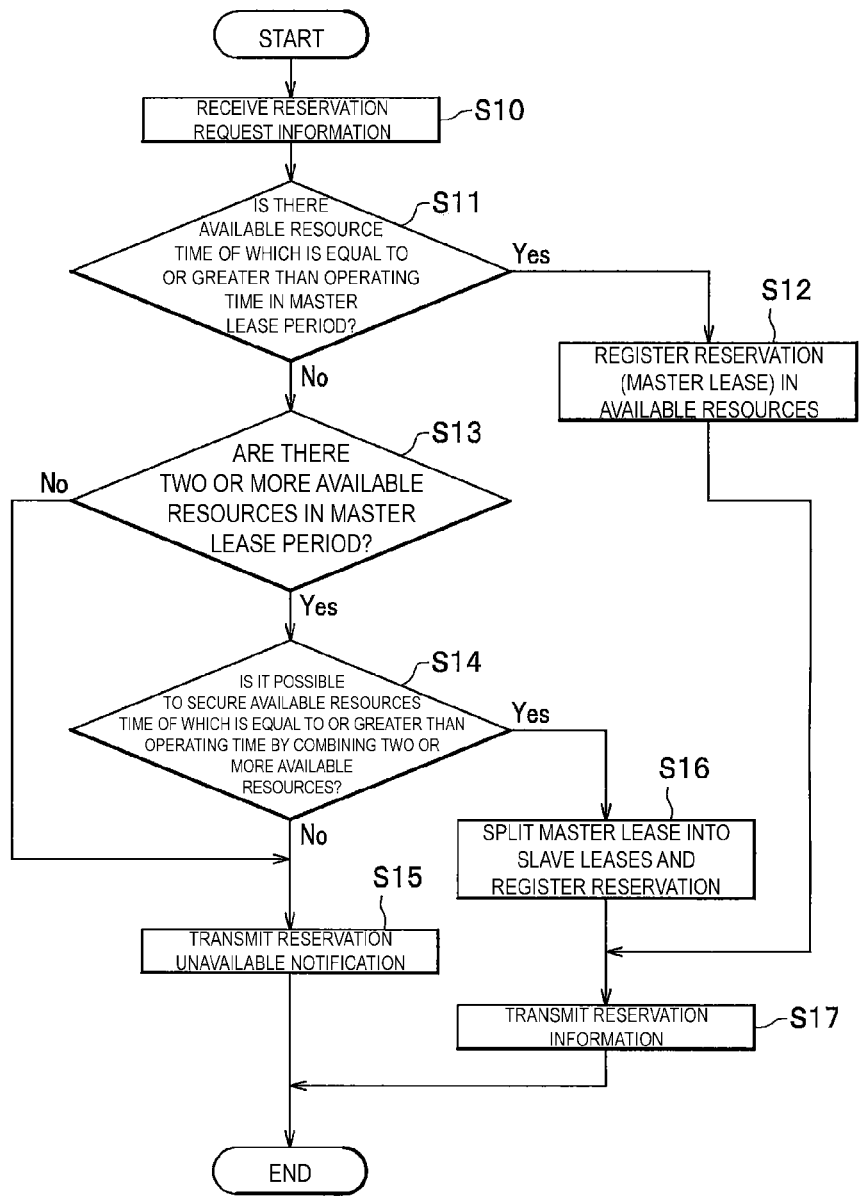
FIG. 3 is a flowchart of reservation setting processing executed by the resource reservation management apparatus according to the present embodiment.
Figure 4:
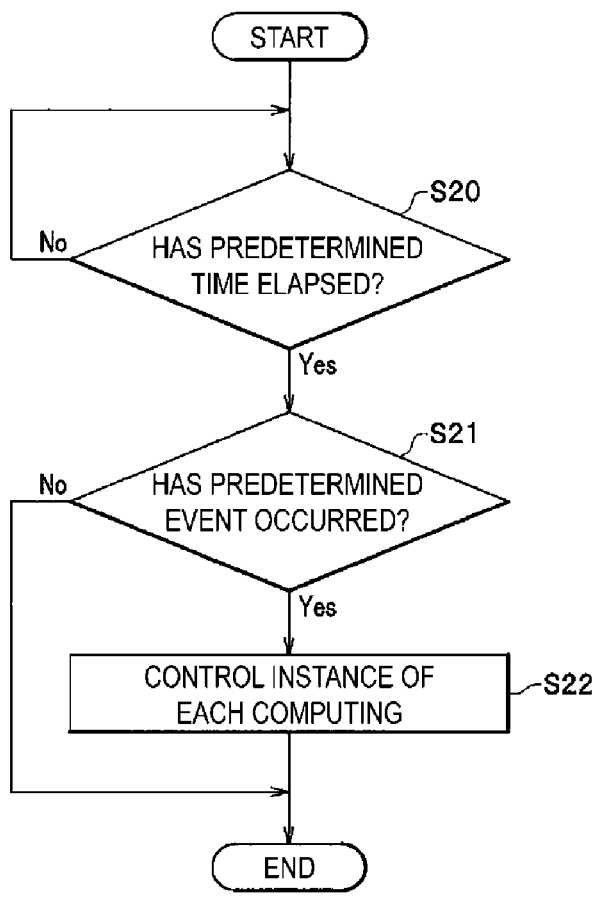
FIG. 4 is a flowchart of instance state control processing executed by the resource reservation management apparatus according to the present embodiment.

Next, a flowchart of processing executed by the resource reservation management apparatus 10 will be described with reference to FIGS. 3 and 4. Referring to FIG. 3, reservation setting processing in which reservation request information is received from the user terminal 5 and resources are reserved will be described. Referring to FIG. 4, instance state control based on slave leases set in the resource reservation table 110 (FIG. 1) will be described.

FIG. 3 is a flowchart illustrating reservation setting processing executed by the resource reservation management apparatus 10 according to the present embodiment.

First, the reservation notification unit 11 of the resource reservation management apparatus 10 receives reservation request information from the user terminal 5 (Step S10). The reservation notification unit 11 inquires of the scheduling unit 12 about whether a reservation is available in response to the reservation request information.

Note that the reservation request information includes information such as an operating requested time period, a time (operating time) during which the instance is to operate, and a resource capacity (requested specification).

Next, the scheduling unit 12 makes the following determination with reference to resource information of each computing machine 20 and the resource reservation table 110 (FIG. 1) in the reservation database 100 (Step S11). That is, it is determined whether there is an available resource a time of which is equal to or greater than the operating time from among resources (hosts) that satisfy the resource capacity (requested specification) in the operating requested time period indicated by the reservation request information, that is, a master lease period.

Here, if it is determined that there is an available resource a time of which is equal to or greater than the operating time (Step S11→Yes), then the scheduling unit 12 moves on to Step S12.

In Step S12, the scheduling unit 12 registers a reservation (master lease) based on the reservation request information for the available resource a time of which is equal to or greater than the operating time in the resource reservation table 110. Note that the scheduling unit 12 associates the reserved time period during which the resource is available and the host information of the instance with an reservation ID that is identification information of the reservation and registers the associated information. The processing then moves to Step S17.

On the other hand, in a case in which the scheduling unit 12 determines that there is no available resource a time of which is equal to or greater than the operating time in Step S11 (Step S11→No), the processing moves to Step S13.

In Step S13, the scheduling unit 12 determines whether there are two or more available resources in the operating requested time period (within the master lease period) with reference to the resource reservation table 110.

Here, in a case in which there are no two or more available resources (Step S13→No), the scheduling unit 12 moves on to Step S15.

On the other hand, in a case in which there are two or more available resources (Step S13→Yes), the scheduling unit 12 determines whether it is possible to secure available resources a total time of which is equal to or greater than the requested operating time by combining the two or more available resources with reference to the resource reservation table 110 (Step S14).

Here, in a case in which it is not possible to secure available resources a total time of which is equal to or greater than the operating time (Step S14→No), the scheduling unit 12 moves on to Step S15.

In Step S15, the scheduling unit 12 outputs information indicating that reservation is not available to the reservation notification unit 11, and the reservation notification unit 11 transmits a reservation unavailable notification to the user terminal 5 that has transmitted the reservation request information. The reservation notification unit 11 may transmit a resource shortage notification to the service provider terminal 6.

On the other hand, in a case in which it is determined to be possible to secure available resources a total time of which is equal to or greater than the operating time in Step S14 (Step S14→Yes), the scheduling unit 12 splits the master lease into slave leases corresponding to the available resources and registers the reservations thereof (slave leases) in the resource reservation table 110 (Step S16). The processing then moves to Step S17.

Note that the scheduling unit 12 associates the time periods during which the resources reserved in a split manner are available and host information of the instances with a reservation ID that is identification information of the reservation and registers the associated information. Note that as for the reservation ID, one ID (same ID) generated corresponding to the master lease is assigned to each slave lease.

In Step S17, the reservation notification unit 11 receives, from the scheduling unit 12, reservation information including the reservation ID that is the identification information of the reservation, the time periods during which the resources are available, and the host information of the reserved instances and transmits the reservation information to the user terminal 5 that has transmitted the reservation request information.

In this manner, the resource reservation management apparatus 10 according to the present embodiment can create slave leases by splitting the time during which the instance is to operate and reserve the resources even in a case in which it is not possible to secure a continuous available resource. It is thus possible to efficiently utilize available resources.

FIG. 4 is a flowchart illustrating instance state control processing executed by the resource reservation management apparatus 10 according to the present embodiment. Note that the resource reservation management apparatus 10 monitors occurrence of an event (restart, stop, shift, or deletion of the instance) with reference to the resource reservation table 110 (FIG. 1) that the reservation event management unit 13 has stored in the reservation database 100.

First, the reservation event management unit 13 of the resource reservation management apparatus 10 determines whether a predetermined time has elapsed (Step S20). In a case in which the predetermined time has not elapsed (Step S20→No), the reservation event management unit 13 waits for the elapse of the predetermined time. On the other hand, in a case in which a predetermined time has elapsed (Step S20→Yes), the processing moves to next Step S21.

In Step S21, the reservation event management unit 13 determines whether a predetermined event has occurred with reference to the resource reservation table 110 in the reservation database 100.

Here, the predetermined event is restart, stop, shift, or deletion of the instance.

If it is determined that an event has occurred (Step S21→Yes), the reservation event management unit 13 notifies the instance management unit 15 of details of the event via the reservation instance management unit 14. In this manner, the instance management unit 15 controls the state of the instance in each computing machine 20 (Step S22). Note that in a case in which it is determined that the predetermined event has not occurred (Step S21→No), the reservation event management unit 13 ends the processing.

In Step S22, specifically, the reservation event management unit 13 executes each processing described below.

In a case in which the instance has been created and stopped, the reservation event management unit 13 detects occurrence of an event (restart of the instance) at the start clock time of each slave lease of the instance with reference to the resource reservation table 110 (FIG. 1). The reservation event management unit 13 then notifies the instance management unit 15 via the reservation instance management unit 14 that the instance is to be restarted.

The reservation event management unit 13 detects occurrence of an event (stop of the instance) at the end clock time of the slave lease with reference to the resource reservation table 110 (FIG. 1). The reservation event management unit 13 then notifies the instance management unit 15 via the reservation instance management unit 14 that the instance is to be stopped.

After the instance is stopped, the reservation event management unit 13 checks whether the host (computing machine 20) reserved for the next slave lease of the instance is different from the host of the stopped instance with reference to the resource reservation table 110 (FIG. 1). When it is determined that the slave lease has been reserved by a different host, the reservation event management unit 13 detects that an event of shifting (migrating) of the instance to the different host (computing machine 20) occurs. The reservation event management unit 13 notifies the instance management unit 15 via the reservation instance management unit 14 that the instance is to be shifted (migrated).

The reservation event management unit 13 detects occurrence of an event (end of the instance) at the end clock time of the master lease (the last one of the slave leases obtained by the splitting in a case in which the slave leases are created), with reference to the resource reservation table 110 (FIG. 1). The reservation event management unit 13 then notifies the instance management unit 15 via the reservation instance management unit 14 that the instance is to be ended. In response to these notifications, the instance management unit 15 controls the instance state (restart, stop, shift, or deletion) in each computing machine 20.

As described above, the resource reservation management apparatus 10 according to the present embodiment can detect occurrence of an event and control an instance state (restart, stop, shift, or deletion of the instance) in each computing machine 20 by referring to the resource reservation table 110 (FIG. 1) at predetermined time intervals and then provide resources to the user terminal 5.

As described above, the resource reservation management apparatus 10, the resource reservation management method, and the resource reservation management program according to the present embodiment make it possible to create slave leases by splitting a time during which an instance is to operate and to reserve resources even in a case in which it is not possible to secure a continuous available resource. It is thus possible to efficiently utilize available resources.

REFERENCE SIGNS LIST

5 User terminal
6 Service provider terminal
10 Resource reservation management apparatus
11 Reservation notification unit
12 Scheduling unit
13 Reservation event management unit (reservation management unit)
14 Reservation instance management unit (reservation management unit)
15 Instance management unit
20 Computing machine
100 Reservation database
110 Resource reservation table (resource reservation information)
1000 Resource reservation management system

The invention claimed is:

1. A resource reservation management apparatus configured to perform management for providing, to a user terminal, resources configured of a plurality of computing machines on a cloud, the resource reservation management apparatus comprising:
    a storage medium configured to store a resource capacity of each of the plurality of computing machines and resource reservation information indicating a presence or absence of reservation setting of an instance in chronological order for each of the plurality of computing machines;
    a reservation notification unit, including one or more processors, configured to receive, as a reservation of a master lease, from the user terminal, reservation request information including an operating requested time period indicating a time period during which operating of the resources is requested, an operating time indicating a time during which the instance is to operate, and a requested specification indicating a resource capacity of a requested resource, and transmit, as reservation information, a reservation ID assigned to the reservation of the master lease and a reservation result of the resources to the user terminal that has transmitted the reservation request information;
    a scheduling unit, including one or more processors, configured to determine whether there is an available resource of each of the plurality of computing machines which satisfies the requested specification and a time of which is equal to or greater than the operating time in the operating requested time period of the master lease indicated by the reservation request information with reference to the resource capacity of each of the plurality of computing machines and the resource reservation information, and in a case in which there is no such available resource, generate slave leases by splitting the operating time of the master lease in accordance with times corresponding to available resources indicated by the resource reservation information in the operating requested time period of the master lease, and set a reservation of each of the generated slave leases in the resource reservation information along with the reservation ID;

a reservation management unit, including one or more processors, configured to detect occurrence of predetermined events including stop, shift, restart, and deletion of a created instance by referring to the resource reservation information at predetermined time intervals; and an instance management unit, including one or more processors, configured to receive an instance creation request including the reservation ID from the user terminal, identify a computing machine for executing an instance of each of the slave leases set in the resource reservation information using the reservation ID, transmit an instance creation instruction to the identified computing machine, cause the computing machine to create the instance, and transmit instruction information in accordance with the detected predetermined events to the computing machine.

2. A resource reservation management method for a resource reservation management apparatus configured to perform management for providing, to a user terminal, resources configured of a plurality of computing machines on a cloud, wherein the resource reservation management apparatus includes a storage medium configured to store a resource capacity of each of the plurality of computing machines and resource reservation information indicating a presence or absence of reservation setting of an instance in chronological order for each of the plurality of computing machines, and the resource reservation management method comprises:

receiving, as a reservation of a master lease, from the user terminal, reservation request information including an operating requested time period indicating a time period during which operating of the resources is requested, an operating time indicating a time during which the instance is to operate, and a requested specification indicating a resource capacity of a requested resource, and transmitting, as reservation information, a reservation ID assigned to the reservation of the master lease and a reservation result of the resources to the user terminal that has transmitted the reservation request information;

determining whether there is an available resource of each of the plurality of computing machines which satisfies the requested specification and a time of which is equal to or greater than the operating time in the operating requested time period of the master lease indicated by the reservation request information with reference to the resource capacity of each of the plurality of computing machines and the resource reservation information, and in a case in which there is no such available resource, generating slave leases by splitting the operating time of the master lease in accordance with times corresponding to available resources indicated by the resource reservation information in the operating requested time period of the master lease, and setting a reservation of each of the generated slave leases in the resource reservation information along with the reservation ID assigned to the master lease;

transmitting, as reservation information, the reservation ID and a reservation result of the resources to the user terminal that has transmitted the reservation request information;

receiving, from the user terminal, an instance creation request including the reservation ID, identifying a computing machine for executing an instance of each of the slave leases set in the resource reservation information using the reservation ID, transmitting an instance creation instruction to the identified computing machine, and causing the computing machine to create the instance;

detecting occurrence of predetermined events including stop, shift, restart, and deletion of the created instance by referring to the resource reservation information at predetermined time intervals; and transmitting instruction information in accordance with the detected predetermined events to the computing machine.

3. A non-transitory computer readable medium storing one or more instructions causing a computer to fuction as a resource reservation management apparatus configured to perform management for providing, to a user terminal, resources configured of a plurality of computing machines on a cloud, wherein the resource reservation management apparatus includes a storage medium configured to store a resource capacity of each of the plurality of computing machines and resource reservation information indicating a presence or absence of reservation setting of an instance in chronological order for each of the plurality of computing machines, and the one or more instructions causing the computer to execute receiving, as a reservation of a master lease, from the user terminal, reservation request information including an operating requested time period indicating a time period during which operating of the resources is requested, an operating time indicating a time during which the instance is to operate, and a requested specification indicating a resource capacity of a requested resource, and transmitting, as reservation information, a reservation ID assigned to the reservation of the master lease and a reservation result of the resources to the user terminal that has transmitted the reservation request information;

determining whether there is an available resource of each of the plurality of computing machines which satisfies the requested specification and a time of which is equal to or greater than the operating time in the operating requested time period of the master lease indicated by the reservation request information with reference to the resource capacity of each of the plurality of computing machines and the resource reservation information, and in a case in which there is no such available resource, generating slave leases by splitting the operating time of the master lease in accordance with times corresponding to available resources indicated by the resource reservation information in the operating requested time period of the master lease, and setting a reservation of each of the generated slave leases in the resource reservation information along with the reservation ID assigned to the master lease;

transmitting, as reservation information, the reservation ID and a reservation result of the resources to the user terminal that has transmitted the reservation request information;

receiving, from the user terminal, an instance creation request including the reservation ID, identifying a computing machine for executing an instance of each of the slave leases set in the resource reservation information using the reservation ID, transmitting an instance creation instruction to the identified computing machine, and causing the computing machine to create the instance;

detecting occurrence of predetermined events including stop, shift, restart, and deletion of the created instance by referring to the resource reservation information at predetermined time intervals; and transmitting instruction information in accordance with the detected predetermined events to the computing machine.

* * * * *